United States Patent

Haynes, III et al.

(10) Patent No.: US 8,521,407 B2
(45) Date of Patent: Aug. 27, 2013

(54) SYSTEM AND METHOD FOR ENSURING A PERSON REACHES A DESTINATION ON TIME

(75) Inventors: James Haynes, III, San Francisco, CA (US); Anthony W. Ulwick, Aspen, CO (US)

(73) Assignee: GM Global Technology Operations LLC

(*) Notice: Subject to any disclaimer, the term of this patent is extended or adjusted under 35 U.S.C. 154(b) by 55 days.

(21) Appl. No.: 13/233,533

(22) Filed: Sep. 15, 2011

(65) Prior Publication Data

US 2012/0316763 A1 Dec. 13, 2012

Related U.S. Application Data

(60) Provisional application No. 61/495,583, filed on Jun. 10, 2011, provisional application No. 61/496,246, filed on Jun. 13, 2011.

(51) Int. Cl.
| | | |
|---|---|---|
| G06F 19/00 | (2011.01) | |
| G06G 7/70 | (2006.01) | |
| G06G 7/76 | (2006.01) | |
| G08G 1/00 | (2006.01) | |

(52) U.S. Cl.
USPC ............ 701/117; 701/204; 701/201; 701/300

(58) Field of Classification Search
USPC ................... 701/117, 19, 433, 467, 465, 533, 701/532, 408, 410; 455/456.3, 418
See application file for complete search history.

(56) References Cited

U.S. PATENT DOCUMENTS

| | | | | |
|---|---|---|---|---|
| 6,178,378 | B1* | 1/2001 | Leibold | 701/533 |
| 7,499,715 | B2* | 3/2009 | Carro et al. | 455/456.3 |
| 7,627,423 | B2* | 12/2009 | Brooks | 701/433 |
| 7,974,873 | B2* | 7/2011 | Simmons et al. | 705/7.29 |
| 8,073,614 | B2* | 12/2011 | Coughlin et al. | 701/465 |
| 8,190,359 | B2* | 5/2012 | Bourne | 701/410 |
| 8,254,962 | B2* | 8/2012 | Carro et al. | 455/456.3 |
| 2003/0060979 | A1* | 3/2003 | Andrews et al. | 701/213 |
| 2003/0182052 | A1* | 9/2003 | DeLorme et al. | 701/201 |
| 2005/0234757 | A1* | 10/2005 | Matheson et al. | 705/8 |
| 2006/0291633 | A1 | 12/2006 | Glaza et al. | |
| 2007/0112504 | A1* | 5/2007 | Krause et al. | 701/200 |
| 2007/0219681 | A1* | 9/2007 | Kumar et al. | 701/19 |
| 2007/0219706 | A1* | 9/2007 | Sheynblat | 701/200 |
| 2008/0167938 | A1* | 7/2008 | Meisels et al. | 705/9 |
| 2008/0195312 | A1* | 8/2008 | Aaron et al. | 701/209 |
| 2009/0326800 | A1* | 12/2009 | Kalaboukis et al. | 701/201 |
| 2010/0228473 | A1* | 9/2010 | Ranford | 701/204 |
| 2011/0106436 | A1* | 5/2011 | Bill | 701/206 |
| 2012/0316763 | A1* | 12/2012 | Haynes et al. | 701/117 |

* cited by examiner

*Primary Examiner* — Thomas Black
*Assistant Examiner* — Robert Payne

(57) ABSTRACT

A system includes a first interface module and a route determining module. The first interface module interfaces with a scheduling program and retrieves from the scheduling program a meeting time and a meeting location for a meeting scheduled by a user using the scheduling program. The route determining module determines (i) a route from a first location to the meeting location and (ii) a departure time for the user to depart from the first location to reach the meeting location at the meeting time. The route determining module determines the route and the departure time based on (i) predicted traffic conditions and (ii) predicted weather conditions surrounding the first location and the meeting location prior to the meeting time.

18 Claims, 4 Drawing Sheets

SYSTEM AND METHOD FOR ENSURING A PERSON REACHES A DESTINATION ON TIME

CROSS-REFERENCE TO RELATED APPLICATIONS

This application claims the benefit of U.S. Provisional Application No. 61/495,583, filed on Jun. 10, 2011 and U.S. Provisional Application No. 61/496,246, filed on Jun. 13, 2011. The disclosures of the above applications are incorporated herein by reference in their entirety.

FIELD

The present disclosure relates generally to communication systems for vehicles and more particularly to systems and methods for ensuring that a person reaches a destination on time.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

People frequently schedule meetings and drive to destinations to attend the meetings. People often lookup maps and plan the travel to the destinations using the maps. People also lookup traffic information before or during the travel and plan the travel according to the traffic conditions. People, however, cannot be sure that they will reach the destination at the scheduled meeting time. Further, people have to gather the maps and traffic information and plan the travel.

SUMMARY

A system includes a first interface module and a route determining module. The first interface module interfaces with a scheduling program and retrieves from the scheduling program a meeting time and a meeting location for a meeting scheduled by a user using the scheduling program. The route determining module determines (i) a route from a first location to the meeting location and (ii) a departure time for the user to depart from the first location to reach the meeting location at the meeting time. The route determining module determines the route and the departure time based on (i) predicted traffic conditions and (ii) predicted weather conditions surrounding the first location and the meeting location prior to the meeting time.

A method includes interfacing with a scheduling program and retrieving from the scheduling program a meeting time and a meeting location for a meeting scheduled by a user using the scheduling program. The method further includes determining (i) a route from a first location to the meeting location and (ii) a departure time for the user to depart from the first location to reach the meeting location at the meeting time. The determinations are based on (i) predicted traffic conditions and (ii) predicted weather conditions surrounding the first location and the meeting location prior to the meeting time.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
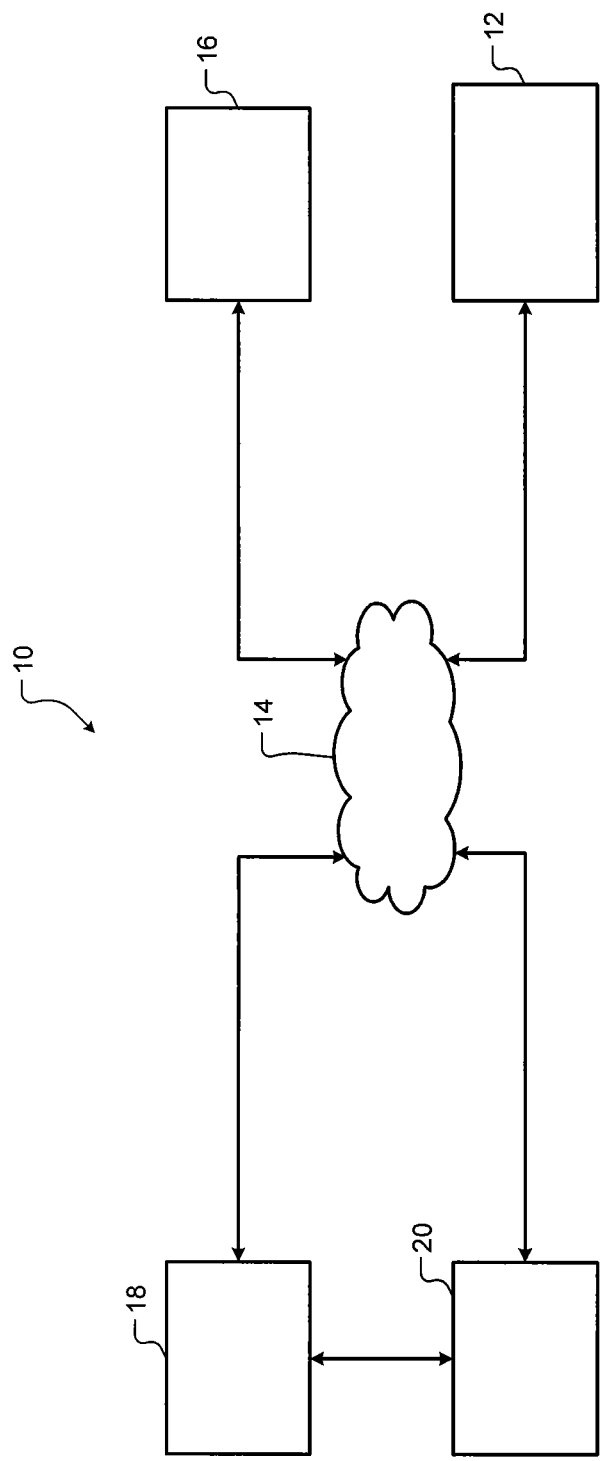
FIG. 1 depicts a system comprising a communication system for ensuring that a person reaches a destination at a scheduled meeting time.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure relates to systems and methods for ensuring that a person (e.g., a driver or a passenger) of a vehicle reaches a destination for a scheduled meeting at a scheduled time. The systems and methods are implemented using the Internet. The systems and methods can automatically gather a meeting location and a meeting time for a meeting scheduled by a user. Based on the meeting location and the meeting time, the systems and methods can automatically gather maps and traffic and weather information, plan the travel to the meeting location, and alter the travel plan as needed based on changes in traffic and weather conditions. For example, when the person schedules the meeting (e.g., using a calendar program), the systems and methods perform the following functions automatically (i.e., without intervention or interaction from the person) based on the scheduled meeting location and meeting time.

The systems and methods determine a route and a departure time by automatically retrieving the meeting location, the meeting time, and predicted traffic and weather conditions likely to occur along the route during the travel. The predicted traffic and weather conditions can be generated based on historical traffic and weather information available in respective databases. The departure time and the route are automatically output to one or more devices of the user (e.g., a smartphone, a tablet, a laptop, or a personal computer (PC)). Further, prior to the departure time, the systems and methods continue to monitor the traffic and weather conditions along the route and update the departure time and/or the route based on changes in the traffic and weather conditions.

When the person begins the travel at the departure time, the systems and methods continue to monitor the traffic and weather conditions along the route and update the route based on changes in the traffic and weather conditions. The systems and methods may interface with an output system (e.g., an in-dash display and/or audio system) of the vehicle and inform the person of the changes and the updated route via the output system. During the travel, the systems and methods may also interface with a control system of the vehicle (e.g., a traffic monitoring system, a navigation system, etc.) and use the control system to monitor the traffic and weather conditions along the route. Further, the systems and methods may interface with a control system of the vehicle (e.g., a control system that monitors wiper blades, tires, etc.), infer weather and road conditions based on data received from the control system, and update the route based on the data.

Additionally, before the travel begins, the systems and methods may learn travel patterns of the person. For example, depending on the time of the day of travel, the person may stop to drop off another person, and/or at a restaurant, a bank, and/or a gas station, etc. Depending on the travel patterns, the systems and methods may automatically plan ahead for one or more stops and adjust (pre-pone) the departure time accordingly so that the person arrives at the meeting location at the scheduled meeting time.

Further, the systems and methods may gather information about parking places near the meeting location, select one of the parking places based on the needs of the person, and adjust the departure time and the route based on a distance between the meeting place and the selected parking place. During the travel, the systems and methods may continue to gather information about the parking places, update the route depending on the time constraints of the person and the availability of the parking places, and guide the person to the best available parking place.

Referring now to FIG. 1, the systems and methods of the present disclosure may be implemented using the Internet. For example, a system 10 may include a communication system 12 for ensuring that a person reaches a meeting location at a meeting time according to the present disclosure. The system 10 may further include the Internet 14, a mail/calendar server 16, a device 18, and a vehicle 20. The device 18 and the vehicle 20 can communicate with the Internet 14 using one or more networks. For example, the networks may include a cellular network, a satellite network, a local area network (LAN), and/or a wide area network (WAN).

The device 18 executes a scheduling program, which the person uses to schedule a meeting at a meeting time and a meeting location. The scheduling program (e.g., a calendar program) may run on the mail/calendar server 16. The device 18 may connect to the mail/calendar server 16 via the Internet 14. While only one device, one mail/calendar server, and one vehicle are shown, the system 10 may include multiple devices, mail/calendar servers, and vehicles. Further, the communication system 12 may be distributed at multiple geographic locations.

The communication system 12 communicates with the device 18, the mail/calendar server 16, and the vehicle 20 via the Internet 14. Communications between the communication system 12 and each of the device 18, the mail/calendar server 16, and the vehicle 20 can be secured based on subscription of the person to the communication system 12. The communication system 12 may maintain and/or access multiple databases via the Internet 14. The databases may include information relating to maps, traffic, weather, etc.

In use, the person uses the device 18 to schedule a meeting using a calendar program from home, office, etc. The meeting information (e.g., location, time, etc.) is stored on the mail/calendar server 16. The communication system 12 retrieves the meeting information from the mail/calendar server 16 via the Internet 14. The communication system 12 sets up a route and a departure time for the person from home, office, etc. based on the meeting information. The communication system 12 gathers and monitors traffic and weather information on an ongoing basis. The communication system 12 updates the route and/or the departure time based on traffic and weather conditions along the route. The communication system 12 sends the route, the departure time, and any updates to the device 18. The communication system 12 may also set up one or more stops along the route based on the travel patterns of the person and inform the person of the stops.

When the person begins the travel along the route, the communication system 12 communicates with the vehicle 20 in addition to, or instead of, the device 18. If multiple persons use the vehicle 20, the communication system 12 may identify the person based on the identification information of the person stored in the device 18 and/or a key fob belonging to the person. The device 18 may communicate with the vehicle 20 via Bluetooth®, for example. Alternatively or additionally, the person may use the key fob to operate the vehicle 20. The communication system 12 may retrieve the identification information of the person from the device 18 and/or the vehicle 20. Based on the identification information, the communication system 12 may monitor and update the route of the identified person. The communication system 12 may output updated information to the person via an output system (e.g., an in-dash display and/or speaker system) of the vehicle 20. The communication system 12 may also adjust the route and the stops of the identified person depending on the traffic and weather conditions along the route and whether the person can reach the meeting location at the scheduled meeting time.

Figure 2:
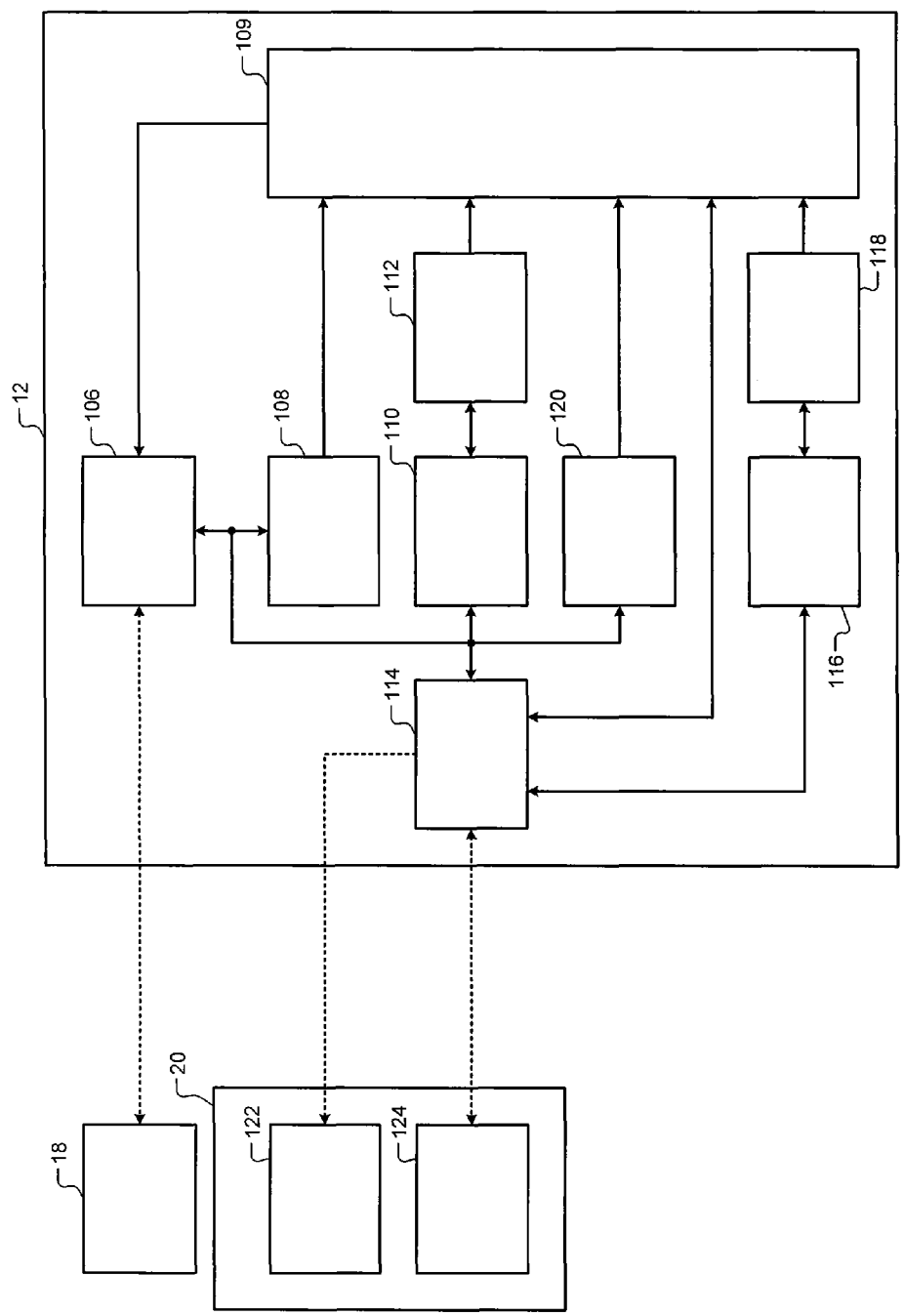
FIG. 2 is a functional block diagram of the communication system of FIG. 1.

Referring now to FIG. 2, the communication system 12 is shown in detail. The Internet 14 and the mail/calendar server 16 are omitted for simplicity of illustration. The vehicle 20 may include one or more vehicle control systems 122 and/or one or more output systems 124. The vehicle control systems 122 may include a traffic monitoring system, a weather monitoring system, a navigation system, a vehicle monitoring system, etc. For example, the vehicle control systems 122 may include an OnStar® system. The output systems 124 may include an in-dash display system, a speaker system, etc.

The communication system 12 includes a device interface module 106, a calendar interface module 108, a route determining module 109, a monitoring module 110, an updating module 112, a vehicle interface module 114, a learning module 116, a planning module 118, and a parking module 120. The device interface module 106 interfaces the communication system 12 to the device 18 via the Internet 14. The vehicle interface module 114 interfaces the communication system 12 to one or more vehicle control systems 122 and/or one or more output systems 124 of the vehicle 20 via the Internet 14.

The calendar interface module 108 interfaces with the scheduling program via the device interface module 106. Alternatively, the calendar interface module 108 may interface with the scheduling program via the Internet 14. The calendar interface module 108 retrieves from the scheduling program the meeting time and the meeting location scheduled by the user.

The route determining module 109 determines a route from a first location to the meeting location and a departure time for the user to depart from the first location to reach the meeting location at the meeting time. For example, the first location may include an office location, a home location, or any other location from where the user may depart for the meeting location.

The route determining module 109 determines the route and the departure time based on predicted traffic conditions and predicted weather conditions surrounding the first location and the meeting location. The route determining module 109 outputs the route and the departure time to the user on the device 18. The route determining module 109 receives the predicted traffic conditions and predicted weather conditions from the monitoring module 110. The monitoring module 110 monitors the past and current traffic and weather patterns and determines the predicted traffic and weather conditions based thereon.

Specifically, prior to the departure time, the monitoring module 110 monitors the traffic and weather conditions surrounding the first location and the meeting location. The updating module 112 may update the route and/or the departure time based on the monitored traffic and weather conditions. The route determining module 109 outputs the updated route and/or departure time to the user on the device 18.

The monitoring module 110 may monitor the traffic and weather conditions using various sources. For example, the monitoring module 110 may access traffic and weather databases on the Internet 14. The monitoring module 110 may access the databases directly via the Internet 14 or via the device 18, which may have a connection to the Internet 14.

Additionally, prior to the departure time, the route determining module 109 may determine/update the route and/or the departure time based on inputs received from the planning module 118 and/or the parking module 120. The planning module 118 may plan one or more stops for the user between the first location and the meeting location. For example, the planning module 118 may plan one or more stops based on travel patterns of the user learned by the learning module 116.

The learning module 116 may learn the travel patterns from travel data gathered during prior travels. For example, the learning module 116 may gather the travel data from one or more vehicle control systems 122 (e.g., the OnStar® system).

Alternatively or additionally, the learning module 116 may gather the travel data from one or more databases maintained on the Internet 14. The databases may include the travel data gathered from prior routes traveled by the vehicle 20, communications made by the person using the device 18, transactions made by the person during prior trips (e.g., credit/debit card purchases), etc. The learning module 116 may access the databases directly via the Internet 14 or via the device 18, which may have a connection to the Internet 14.

The planning module 118 may plan one or more stops along the route using the travel patterns. The planning module 118 may plan the stops based on the meeting location, the meeting time, the route, and the departure time. The route determining module 109 may adjust the route and the departure time based on the stops.

The parking module 120 may receive parking information of parking locations near the meeting location based on the meeting location and the meeting time and may select one of the parking locations before the travel begins. The parking module 120 may select the parking location based on factors such as distance from the parking location to the meeting location, parking expenses, special needs of the person, etc. The route determining module 109 may determine/adjust the route and the departure time based on the selected parking location.

During the travel, the monitoring module 110 monitors traffic and weather while the user travels along the route. The monitoring module 100 may monitor traffic and weather by accessing relevant databases on the Internet 14. The monitoring module may access the databases directly via the Internet 14, via the device 18, or via one or more of the vehicle control systems 122, which may have connections to the Internet 14. Additionally, the monitoring module 110 may infer weather and/or road conditions from data received from a vehicle control system that monitors wiper blades, tires, etc., for example.

The updating module 112 may update the route based on the monitored traffic and weather and other conditions. The route determining module 109 may output the updated route to the person via one or more of the output systems 124 of the vehicle 20. For example, the route determining module 109 may output the updated route on an in-dash display and/or via a speaker system of the vehicle 20.

In addition, the parking module 120 may continue to receive information about parking places around the meeting location and may select a different parking location depending on where along the route the user is and whether a different parking location can help the user reach the meeting location at the scheduled meeting time. For example, the parking location selected before departure may be far from the meeting location, and delays due to weather, traffic, road construction, etc. may occur during the travel. If a parking location is available close to the meeting place, the parking module 120 provides the information to the route determining module 109. The route determining module 109 may adjust the route according to the newly selected parking location and output the updated route to the user on the output system of the vehicle. Thus, the person can reach the meeting location at the scheduled meeting time with minimal distractions.

Figure 3:
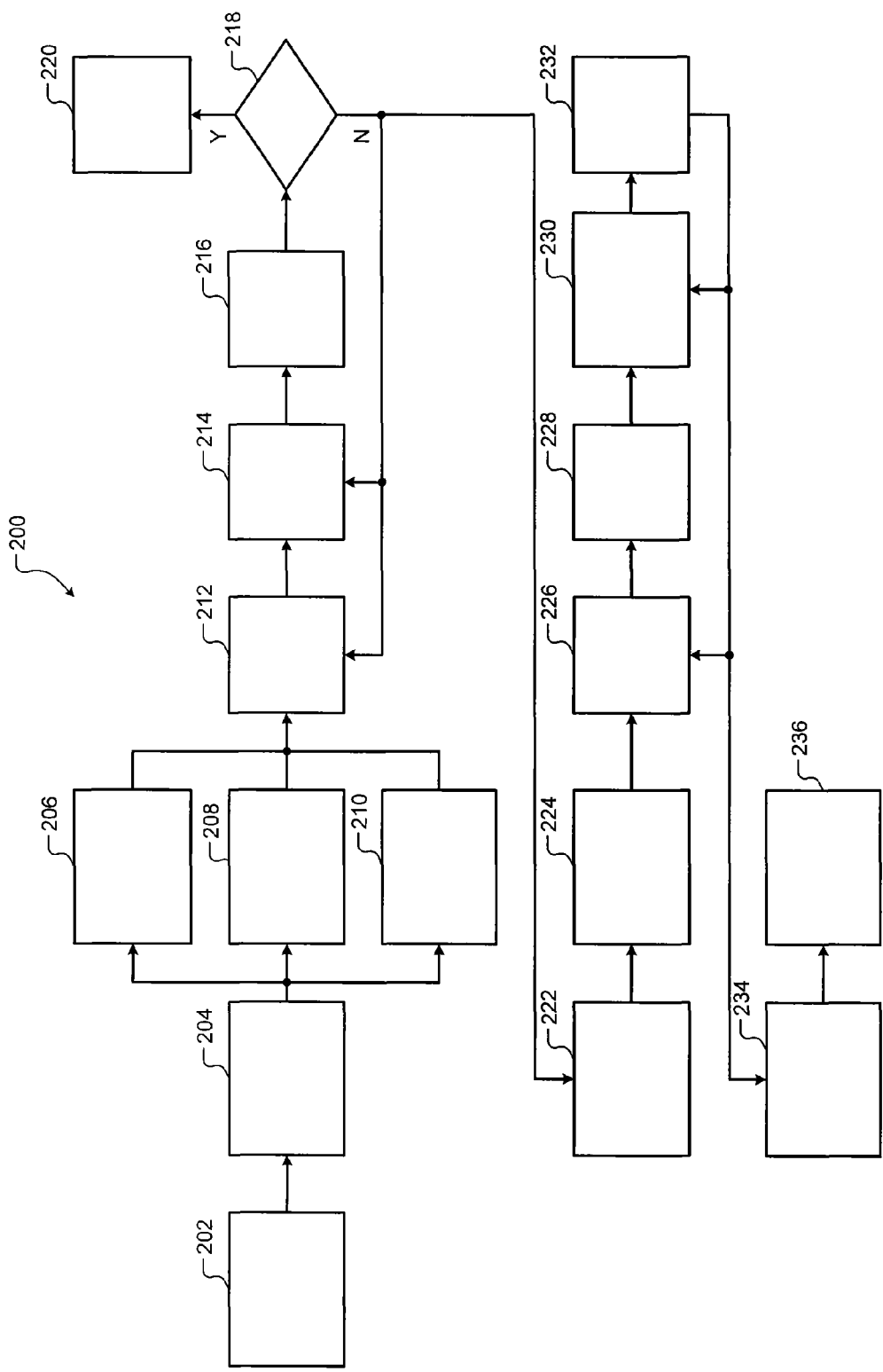
FIG. 3 is a flowchart of a method for ensuring that a person reaches a destination at a scheduled meeting time.

Referring now to FIG. 3, a job map (method) 200 for ensuring that a person reaches a destination at a scheduled meeting time is shown. Unlike a process map that shows operations performed by a job executor (e.g., a driver or a passenger of a vehicle), the job map 200 shows functions performed by the systems and methods of the present disclosure. These functions help the job executor perform the operations. The context in which persons execute the job may include but are not limited to home, office, school, or while walking. The job map 200 outlines a solution that uses information to help a person execute the job of getting to a meeting location at a scheduled meeting time.

Control begins at 202 and retrieves appointment details (meeting time and location) from the calendar program of the user. Control estimates departure time under normal traffic and weather conditions at 204. Control determines time to allow for vehicle preparation at 206. For example, vehicle preparation may include loading/unloading the vehicle. Control determines time to allow for atypical travel conditions at 208. For example, atypical travel conditions may include construction, road closures, detours, immigration delays, etc. At 210, control determines time to allow for errands, if any, to be run along the route. At 212, control sets the route based on determinations made at 204-210. At 214, control plans one or more stops along the route. Control sets the departure time at 216.

At 218, control determines whether to make the trip. Control aborts the job at 220 if the trip is canceled. Control proceeds to 222 if the trip is not canceled. At 222, the person proceeds to the vehicle. The person prepares the vehicle at 224. The person begins driving the vehicle to the meeting location at 226. The person makes planned stops at 228.

At 230, control assesses if the person can reach the meeting location at the scheduled meeting time. Control may cancel one or more stops if the assessment indicates that the person may be late due to one or more of the planned stops. At 232, control adjusts the route as needed to ensure that the person arrives at the meeting location at the scheduled meeting time. Control may also inform the person of the canceled stop or stops and the updated route and guide the person to the selected parking location. At 234, the person parks the vehicle at the selected parking location. At 236, the person proceeds to the meeting location at the scheduled meeting time.

Figure 4:
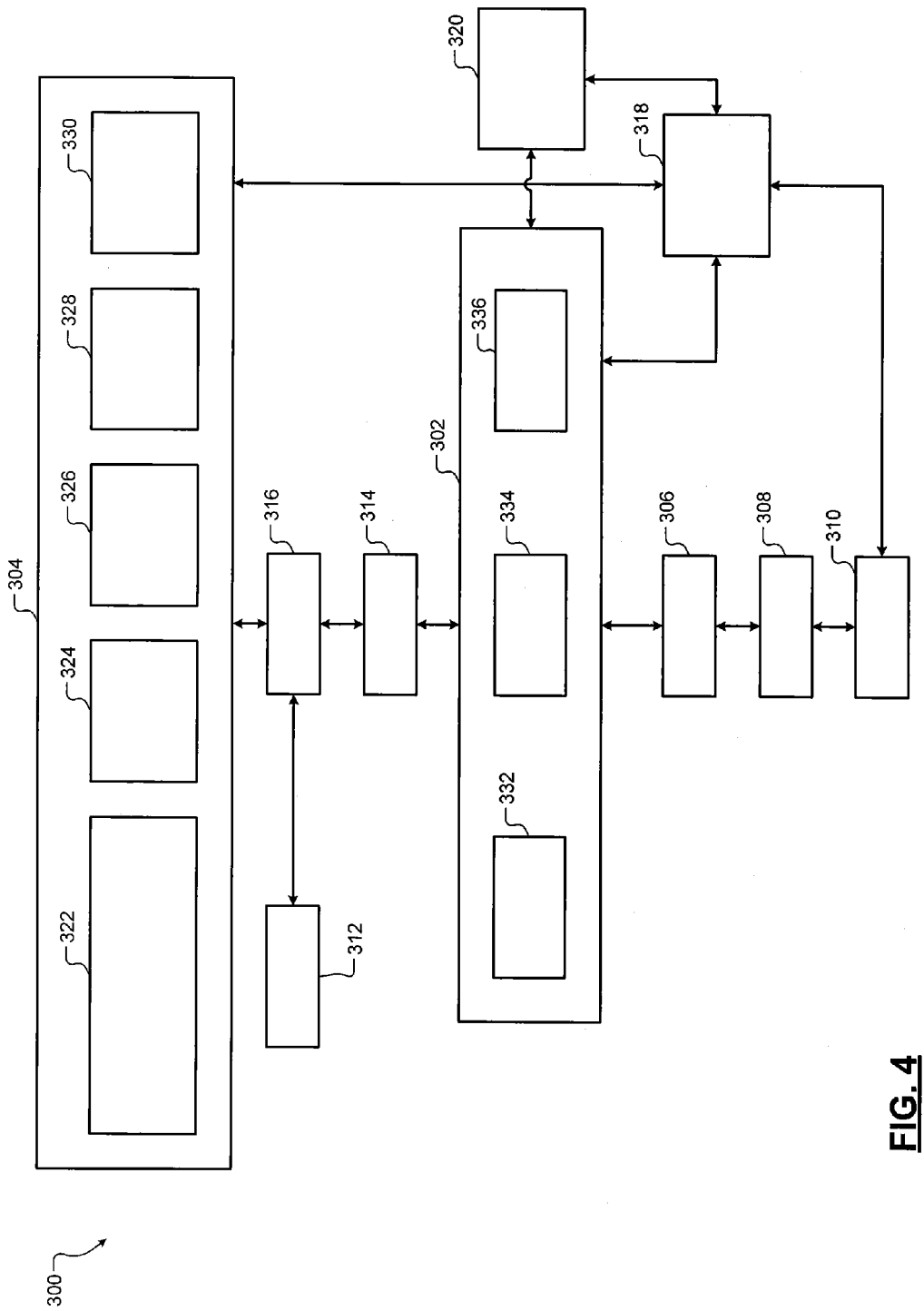
FIG. 4 is an example of an implementation of the system and method shown in FIGS. 2 and 3.

Referring now to FIG. 4, an example of an implementation 300 of the communication system 12 and the method 200 is shown. The implementation 300 utilizes a decision-making module (shown as engines) 302 that processes information from different sources (e.g., information module 304) and that helps ensure that a person reaches a meeting location at a scheduled meeting time with minimal effort. The decision-making module 302 works with existing devices of a customer (shown as user interfaces 310, e.g., PC, laptop, phone, or tablet) and calendar services (e.g. Outlook, iCal, Google Calendar). The decision-making module 302 can access the devices via a protected gateway 306, which connects to the user interfaces 310 via one or more networks (shown as connectivity) 308.

The decision-making module 302 can also be integrated with control systems and in-dash displays of vehicles (shown as vehicle) 312. The decision-making module 302 can retrieve information about a vehicle from the control systems of the vehicle and can inform the person of the decisions via the in-dash display of the vehicle. For example, the decision-making module 302 can communicate with the vehicle 312 via a protected gateway 314, which connects to the vehicle 312 via one or more networks (shown as connectivity) 316.

The decision-making module 302 can access the information in the information module 304 through the protected gateway 314 and connectivity 316. Alternatively or additionally, the decision-making module 302 can access the information in the information module 304 through the protected gateway 306, connectivity 308, user interfaces 310, and a feedback module 318. The feedback module 318 allows the decision-making module 302, the user interfaces 310, and the information module 304 to exchange data. Additionally, the feedback module 318 allows the decision-making module 302 to learn preferences of the person (e.g., infer destination based on day of the week, time of the day, driver ID, presence/absence of a passenger, etc.). The decision-making module 302 can also include application programming interfaces (APIs) 320. The APIs 320 allow the decision-making module 302 to pull data from multiple sources having information related to traffic and weather, events and parking, maps and road construction, calendars, etc.

More specifically, the information module 304 includes information databases 322 such as calendar programs of users, traffic and weather databases, routes and events databases, parking databases, etc. The information module 304 also includes location elements 324, time elements 326, vehicle elements 328, and real-time elements 330. The location elements 324 identify where the user is located at any given time. The time elements 326 characterize time of the day (e.g., rush hour). The vehicle elements 328 provide information about configurations and capabilities of vehicles (e.g., year, make, and model; whether equipped with control systems such as navigation systems; etc.) The real-time elements 330 provide real-time information (e.g., current traffic and weather conditions, updated route based on current traffic and weather conditions, etc.).

The decision-making module 302 performs core decision-making functions using various decision-making engines. For example, the decision-making module 302 may include a decision engine 332 to decide the route and the departure time based on the information received from the information module 304. A past/predictive engine 334 analyzes past (historical) data related to traffic and weather patterns, travel patterns of the person, etc. The past/predictive engine 334 provides related predictive data to the decision engine 332 and an optimization engine 336. The optimization engine 336 optimizes the decisions related to the route and the departure time based on the predictive data.

The decision-making module 302 may include additional engines such as a weather engine, a traffic engine, a navigation engine, a parking engine, etc. One or more of these engines may be included in, or may be part of, other engine or engines in the decision-making module 302. One or more of these engines may exchange information with other engines in the decision-making module 302.

The decision-making module 302 makes decisions based on the information received from the information module 304 and in turn also update the information in the information module 304 with the decisions made. For example, the decision-making module 302 may update the information in the information module 304 via the feedback module 318. The decision-making module 302 can perform the core decision-making functions in the Internet cloud, which allows ongoing and automatic updates to the decisions and the information in the information module 304 with minimal effort or activity required from the customer. Accordingly, the decision-making module 302 minimizes driver distraction.

The decision-making module 302 works with most popular devices and does not require additional end-user hardware. The decision-making module 302 can detect resources available to the user (e.g., device or devices used by the user, data plans used by the user, etc.) and scale service depending on available resources. Minimally essential capability is made available on a user-owned device.

Functions or services performed by the decision-making module 302 can be scaled up as more resources become available. Further, the services can be scaled on a subscription basis. The services are scalable to multiple users. The services can be provided in different geographic areas. The services can utilize existing data plans of the customer for transferring data to the phone device of the user (e.g., providing alerts including updated departure time by SMS). The services interface with other devices of the user either directly or as a tether/conduit to the vehicle instead of relying on a phone embedded in the vehicle to minimize variable costs of data transfer. The decision-making module 302 can also cache data in case of lapses in cellular coverage. If connectivity is lost, the decision-making module 302 will provide service with at least the information as of when the connectivity was lost.

Further, the decision-making module 302 can be a node in a probe network and be able to transmit rich data in addition to location and speed of a vehicle. The decision-making module 302 also leverages information from the vehicle systems such as wipers on/off, degree of congestion of opposing traffic using a front camera, wheel spin events, etc. The decision-making module 302 minimizes privacy barriers to adoption and use of the services. Individual identification information is not retained at any central server sites longer than necessary. Individual historical data are retained only on user-controlled devices.

In summary, when a user enters a meeting time and location in the calendar, the communication system 12 automatically synchronizes with a user's calendar, identifies the meeting time and location, calculates the route, determines travel time and departure time based on historical and current traffic and weather patterns, and creates a scheduled travel time and departure time and route on the user's calendar. If the weather and/or traffic conditions change, the communication system 12 automatically adjusts the travel time on the user's calendar and notifies the user of a new route and/or departure time. This feature minimizes the time it takes to determine how much time is needed to deal with adverse weather conditions, e.g., snow, ice, rain, etc. This feature also allows the communication system 12 to track the person's schedule and time allocated to reach the destination at the scheduled meeting time. This feature provides at least the following benefits before the person starts the drive to the destination: minimizing the likelihood of failing to consider traffic build up that routinely occurs at different times of the day when setting the route, and minimizing the likelihood of failing to be informed of a change in the departure time, e.g., due to a recent accident, a change in conditions, etc.

The communication system 12 includes a vehicle synchronization feature. This allows the job executor to automatically connect to an in-dash display of the vehicle so that navigation and information updates can be provided by the communication system 12 in a safer and larger interface relative to a handheld device. Vehicle synchronization provides at least the following benefits to the person while driving the vehicle: minimizing the likelihood of encountering an unplanned delay, e.g., a road closure, accident, construction, etc.; minimizing the time it takes to determine if an alternate route should be taken to save time due to unexpected travel conditions; minimizing the time it takes to determine how much travel time will be saved using possible alternate routes; minimizing the time it takes to determine which alternative route to select, e.g., to get to the destination on time, to make needed stops, etc.; minimizing the likelihood of missing a turn, e.g., missing an exit, a required turn, etc.; minimizing the likelihood of getting lost, e.g., not knowing where to go, not knowing current location, etc.; minimizing the likelihood of parking in a location where the vehicle can get damaged, e.g., dinged, dented, etc.; and minimizing the likelihood of parking in a location where the vehicle may get burglarized, e.g., broken into, stolen, etc.

The weather engine of the communication system 12 continuously monitors weather conditions along the route before and during the drive. The communication system 12 makes decisions about the departure time and the navigation based on inputs from weather sources and data about traffic and congestion along the route. This feature provides at least the following benefits to the person before and during the drive: minimizing the time it takes to determine how much time is needed to deal with adverse weather conditions, e.g., snow, ice, rain, etc.; minimizing the time it takes to determine how changes in travel conditions along the selected route will impact the arrival time, e.g., traffic, construction, etc.; and minimizing the likelihood of failing to be informed of a change in the updated departure time, e.g., due to a recent accident, a change in conditions, etc.

The traffic engine of the communication system 12 continuously monitors traffic conditions along the route before and during the drive. The communication system 12 makes decisions about the departure time and the navigation based on inputs from traffic, accident, construction, and event sources (e.g., concerts, expositions, sports events, etc.). This feature provides at least the following benefits to the person before and during the drive: minimizing the likelihood of encountering an unplanned delay, e.g., a road closure, accident, construction, etc.; minimizing the time it takes to determine how much time is needed to deal with adverse traffic conditions, e.g., accidents, road closures, construction, etc.; minimizing the time it takes to determine if an alternate route should be taken to save time due to unexpected travel conditions; minimizing the likelihood of traffic build up that routinely occurs at different times of the day being not considered when setting the route; minimizing the time it takes to determine how much travel time will be saved using possible alternate routes; minimizing the time it takes to determine how changes in travel conditions along the selected route will impact the arrival time, e.g., traffic, construction, etc.; minimizing the time it takes to determine which alternative route to select, e.g., to get there on time, to make needed stops, etc.; minimizing the likelihood of failing to be informed of a change in the required departure time, e.g., due to a recent accident, a change in conditions, etc.

The navigation engine of the communication system 12 makes decisions for the person about which route the person should follow to the destination. This feature provides at least the following benefits to the person before and during the drive: minimizing the time it takes to determine if an alternate route should be taken to save time due to unexpected travel conditions; minimizing the likelihood of traffic build up that routinely occurs at different times of the day being not considered when setting the route; minimizing the time it takes to determine how much travel time will be saved using possible alternate routes; minimizing the time it takes to determine how changes in travel conditions along the selected route will impact the arrival time, e.g., traffic, construction, etc.; minimizing the likelihood of missing a turn, e.g., missing an exit, a required turn, etc.; minimizing the likelihood of getting lost, e.g., not knowing where to go, not knowing current location, etc.; and minimizing the time it takes to determine which alternative route to select, e.g., to get there on time, to make needed stops, etc.

The parking engine of the communication system 12 makes decisions for the person about parking. This feature provides at least the following benefits to the person at the end of the drive: minimizing the likelihood of parking in a location where the vehicle may get damaged, and minimizing the likelihood of parking in a location where the vehicle may get burglarized.

While the present disclosure uses a vehicle (e.g., an automobile) as an example, the teachings of the disclosure are applicable to other modes of transportation. For example, the teachings can be used in the context of public transportation. The user may travel using public transportation instead or in addition to using a vehicle. When the user uses public transportation, the user's device receives additional information such as a bus or train route and a departure time of a bus or train on a selected route. The selected bus/train route, the corresponding departure time of a bus/train, and the user's departure time from home/office may be altered if needed.

During the travel in the bus or train, the user's device may receive an updated route from the bus or train station to the destination depending on changes in road conditions between the bus or train station and the meeting location. For example, the user may be prompted to disembark at a different bus/train station. In addition, the teachings can be used when the mode of transportation is simply walking and/or biking. Further, the user may be a driver or a passenger in a vehicle (e.g., in a taxi).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a first interface module that interfaces with a scheduling program and that retrieves from the scheduling program a meeting time and a meeting location for a meeting scheduled by a user using the scheduling program;
a route determining module that determines (i) a route from a first location to the meeting location and (ii) a departure time for the user to depart from the first location to reach the meeting location at the meeting time,
wherein the route determining module determines the route and the departure time based on (i) predicted traffic conditions and (ii) predicted weather conditions surrounding the first location and the meeting location prior to the meeting time;
a monitoring module that monitors traffic and weather while the user travels the route; and
an updating module that updates the route based on the monitored traffic and weather.

2. The system of claim 1 wherein:
the monitoring module monitors traffic and weather surrounding the first location and the meeting location prior to the departure time; and
the updating module updates the departure time based on the monitored traffic and weather.

3. The system of claim 1 further comprising a planning module that plans one or more stops for the user between the first location and the meeting location, wherein the route determining module determines the route and the departure time based on the one or more stops.

4. The system of claim 3 further comprising a learning module that learns travel patterns of the user, wherein the planning module plans the one or more stops for the user between the first location and the meeting location based on the travel patterns.

5. The system of claim 1 further comprising a parking module that receives parking information of a plurality of parking locations near the meeting location before the meeting time and that selects one of the parking locations for a vehicle of the user, wherein the route determining module updates the route and the departure time based on the selected parking location.

6. The system of claim 1 wherein:
the scheduling program is executed by at least one of a plurality of devices including a smartphone, a tablet, a laptop computer, and a personal computer; and
the first interface module receives at least one of the route and the departure time from the route determining module and outputs the at least one of the route and the departure time to the user on the at least one of the plurality of devices.

7. The system of claim 1 further comprising a second interface module that interfaces with an output system of a vehicle of the user and that outputs the updated route to the user on the output system.

8. The system of claim 1 further comprising a second interface module that interfaces with a control system of a vehicle of the user, wherein the monitoring module monitors at least one of the traffic and the weather using the control system.

9. The system of claim 1 further comprising a second interface module that interfaces with a control system of a vehicle of the user and that receives data related to operation of the vehicle, wherein the updating module updates the route based on the data.

10. A method comprising:
interfacing with a scheduling program and retrieving from the scheduling program a meeting time and a meeting location for a meeting scheduled by a user using the scheduling program;
determining (i) a route from a first location to the meeting location and (ii) a departure time for the user to depart from the first location to reach the meeting location at the meeting time,
wherein the determinations are based on (i) predicted traffic conditions and (ii) predicted weather conditions surrounding the first location and the meeting location prior to the meeting time;
monitoring module traffic and weather while the user travels the route; and
updating the route based on the monitored traffic and weather.

11. The method of claim 10 further comprising:
monitoring traffic and weather surrounding the first location and the meeting location prior to the departure time; and
updating the departure time based on the monitored traffic and weather.

12. The method of claim 10 further comprising:
planning one or more stops for the user between the first location and the meeting location; and
determining the route and the departure time based on the one or more stops.

13. The method of claim 12 further comprising:
learning travel patterns of the user; and
planning the one or more stops for the user between the first location and the meeting location based on the travel patterns.

14. The method of claim 10 further comprising:
receiving parking information of a plurality of parking locations near the meeting location before the meeting time;
selecting one of the parking locations for a vehicle of the user; and
updating the route and the departure time based on the selected parking location.

15. The method of claim 10 wherein:
executing the scheduling program on at least one of a plurality of devices including a smartphone, a tablet, a laptop computer, and a personal computer; and
outputting at least one of the route and the departure time to the user on the at least one of the plurality of devices.

16. The method of claim 10 further comprising:
interfacing with an output system of a vehicle of the user; and
outputting the updated route to the user on the output system.

17. The method of claim 10 further comprising:
interfacing with a control system of a vehicle of the user; and
monitoring at least one of the traffic and the weather using the control system.

18. The method of claim 10 further comprising:
interfacing with a control system of a vehicle of the user;
receiving data related to operation of the vehicle; and
updating the route based on the data.

\* \* \* \* \*